United States Patent
Gerundt et al.

(10) Patent No.: US 8,403,119 B2
(45) Date of Patent: Mar. 26, 2013

(54) DEVICE AND METHOD FOR ACTUATING A CLUTCH

(75) Inventors: Oliver Gerundt, Friolzheim (DE);
Bernhard Schlagmueller, Moeglingen (DE); Ulrich Kappenstein, Knittlingen (DE); Yang Shen, Stuttgart (DE);
Carolin Scholler, Marbach Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 1293 days.

(21) Appl. No.: 11/954,540

(22) Filed: Dec. 12, 2007

(65) Prior Publication Data

US 2008/0142334 A1    Jun. 19, 2008

(30) Foreign Application Priority Data

Dec. 14, 2006  (DE) .......................... 10 2006 059 072

(51) Int. Cl.
*F16D 25/12* (2006.01)

(52) U.S. Cl. ................. 192/48.601; 192/85.63

(58) Field of Classification Search .................. None
See application file for complete search history.

(56) References Cited

U.S. PATENT DOCUMENTS

| 7,395,736 | B2* | 7/2008 | Davidsson et al. | 74/665 F |
| 7,534,193 | B2* | 5/2009 | Baxter et al. | 477/35 |
| 7,690,280 | B2* | 4/2010 | Chapelon et al. | 74/661 |
| 7,946,402 | B2* | 5/2011 | Gassmann et al. | 192/85.61 |
| 2007/0289833 | A1* | 12/2007 | Chapelon et al. | 192/48.1 |

FOREIGN PATENT DOCUMENTS

| BR | 9304476 | 5/1994 |
| EP | 1 005 607 | 6/2000 |

* cited by examiner

*Primary Examiner* — David D Le
*Assistant Examiner* — Ryan Dodd
(74) *Attorney, Agent, or Firm* — Michael J. Striker

(57) ABSTRACT

In a device and a method for actuating a clutch of a transmission for transmitting a torque from at least one drive shaft to at least one driven shaft, at least one hydraulically triggered piston acts on a clutch spring element, and a pump that is hydraulically connected to the piston. A reservoir is provided, which is filled with hydraulic fluid and hydraulically connected to the piston and the pump in such a way that the piston is actuated either by the pump or by the reservoir.

5 Claims, 2 Drawing Sheets

DEVICE AND METHOD FOR ACTUATING A CLUTCH

CROSS-REFERENCE TO A RELATED APPLICATION

The invention described and claimed hereinbelow is also described in German Patent Application DE 102006059072.4 filed on Dec. 14, 2006. This German Patent Application, whose subject matter is incorporated here by reference, provides the basis for a claim of priority of invention under 35 U.S.C. 119(a)-(d).

BACKGROUND OF THE INVENTION

The invention relates to a device for actuating a clutch and a method for actuating a clutch.

In vehicles with manually shifted transmissions, the transmission of force from the motor to the transmission occurs, for example, by means of a switchable friction clutch. This friction clutch makes it possible to interrupt the frictional engagement during a gear change. In friction clutches, normally two disks are pressed together in order to be able to transmit a torque via the friction contact. The torque is controlled, for example, by means of the contacting force on the clutch disks. The clutch can be actuated mechanically, hydraulically, or electrohydraulically. There are also automated manually shifted transmissions that are actuated, for example, electrohydraulically.

Clutches of this kind are engaged and disengaged, for example, using hydraulic master and slave cylinders. In conventional manually shifted transmissions, the clutches are embodied so that they are engaged when the master and slave cylinders are not transmitting any hydraulic force to the clutch. By contrast, double clutches of double-clutch transmissions, for example, are normally disengaged, as a result of which the clutch must be engaged for actuation.

In the clutches currently in use, the hydraulic pressure that is required to engage and disengage the clutch is supplied by either a pump or a reservoir.

Hydraulically actuated clutches of this kind are used, for example, in mechanical manually shifted transmissions, automated manually shifted transmissions, double-clutch transmissions, and related designs equipped with friction clutches, e.g. automatic transmissions with automated clutches.

SUMMARY OF THE INVENTION

Accordingly, it is an object of the present invention to provide a device and a method for actuating a clutch, which are further improvement of the existing devices and methods.

A device embodied according to the invention for actuating a clutch in a transmission for transmitting a torque from at least one drive shaft to at least one driven shaft includes a hydraulically triggered piston, which acts on a clutch spring element, and a pump that is hydraulically connected to the piston. A reservoir is also provided that is filled with hydraulic fluid; the reservoir is hydraulically connected to the piston and pump in such a way that the piston is actuated either by means of the pump or by means of the reservoir. Preferably, an annular piston is used for the piston.

One advantage of the device according to the invention is that the actuation of the hydraulically actuated clutch can be divided into two phases. In the first phase, the clutch is moved from a first position into a second position and in the second phase, in order to press the clutch into contact in the second position, a force is exerted that is sufficiently powerful to allow the transmission of torque. In a first embodiment according to the invention, the first phase, i.e. the movement of the clutch from the first position into the second position, is executed by means of the pump and the pressing of the clutch into contact is carried out by means of pressurized hydraulic fluid that is supplied by the reservoir.

Alternatively, in a second embodiment, the force required to move the clutch from the first position into the second position is supplied by the pressurized hydraulic fluid supplied from the reservoir while the force required to press the clutch into contact is supplied by the pump. This makes it possible to improve the function of the clutch while simultaneously reducing the energy consumption in comparison to clutch systems known from the prior art in which the two phases are carried out by one element.

In one embodiment, the pump is a piston pump. When a piston pump is used, preferably the piston pump carries out the movement of the clutch from the first position into the second position. The required force is provided by increasing the pressure of the hydraulic fluid. This is accomplished by moving the piston of the piston pump. The energy consumption required to move the clutch is very low in this case. The required contacting pressure on the clutch is then supplied by the reservoir. The prior application of force on the clutch by the piston permits the use of a small reservoir since moving the clutch does not require a large fluid volume.

Usually, the clutch is returned to the initial position with the aid of a clutch spring element that works in opposition to the force exerted by the piston.

In order to return the clutch to its initial position, the pressure acting on the piston is reduced, as a result of which the force of the clutch spring element suffices to return the clutch to its initial position.

In order to move the clutch rapidly back into the initial position, preferably a connection into a sump is opened. The hydraulic fluid drains into the sump via this connection. The pressure that acts on the piston decreases and the clutch moves from the second position back into the first position. In order to be able to supply the hydraulic fluid that has drained into the sump back to the reservoir, the reservoir is preferably connected to the pump in a way that allows the pump to fill the reservoir. In one embodiment, the connection of the reservoir to the pump is embodied so that it is possible to fill the reservoir in both movement directions of the piston.

Preferably, the pump is also hydraulically connected to the sump containing the hydraulic fluid in order to refill the pump chambers of the pump when the hydraulic fluid has been conveyed into the sump.

When a piston pump is used, the piston pump preferably includes at least two pump chambers that are delimited by a pump piston. In one embodiment, the pump chambers are both hydraulically connected to the sump containing the hydraulic fluid. Movement of the pump piston reduces the size of one pump chamber while increasing the size of the other pump chamber. The pressure rises in the contracting pump chamber while the pressure falls in the expanding pump chamber. Preferably, the connection is opened so that the hydraulic fluid flows out of the sump into the expanding pump chamber. When the pump piston moves in the other direction, causing this pump chamber to contract, the fluid can be conveyed into the reservoir via a connecting line, thus filling the reservoir. In this case, preferably the second pump chamber is connected to the piston of the clutch cylinder so that the movement of the pump piston causes the first pump chamber to expand, thus decreasing the pressure of the hydraulic fluid acting on the piston so that the clutch is once again moved from the second position into the first position assisted by the clutch spring element.

In addition to the use for clutches with only one piston that acts on the clutch spring element, it is also possible to use the clutch-actuating device according to the invention for double clutches. When used for double clutches, these clutches are preferably hydraulically connected to each other so that when the double clutch is actuated, a first clutch of the double clutch engages and a second clutch simultaneously disengages; the first clutch is hydraulically connected to the second clutch, and, in order to assist the movement of the two clutches, hydraulic fluid flows from the one clutch to the other clutch, thus exerting pressure on the latter. In order to press the clutch into the second position and in so doing to exert a sufficiently powerful force on the clutch, it is preferable if one of the two clutches can be acted on with pressurized hydraulic fluid supplied by the reservoir or by the pump.

One advantage of the clutch-actuating device according to the invention is the lower energy consumption in comparison to clutch systems known from the prior art. Also, less power is required to refill the reservoir since the movement of the pump required to fill reservoir is assisted by the movement of the clutch. Particularly for double-clutch transmissions, the principle of force equilibrium can be used.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
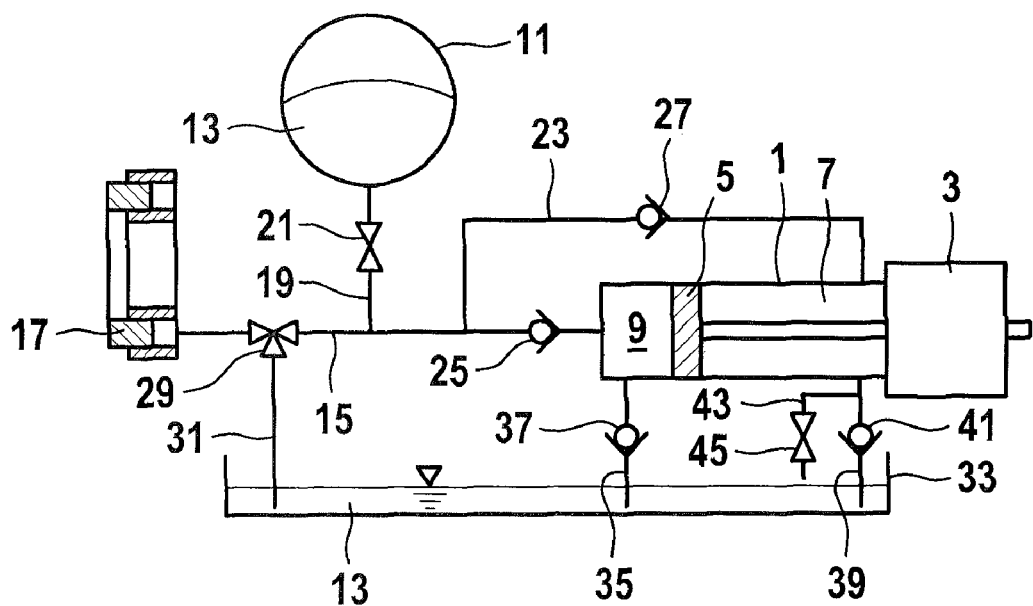
FIG. 1 schematically depicts a first embodiment of the device according to the invention, FIG. 2 schematically depicts a second embodiment of the device according to the invention, FIG. 3 schematically depicts a first embodiment of the device according to the invention for use with a double clutch, and FIG. 4 schematically depicts a second embodiment of the device according to the invention for use with a double clutch.

FIG. 1 shows a first embodiment of a clutch-activating device that is embodied according to the invention.

A device for actuating a clutch in a transmission for transmitting a torque from at least one drive shaft to at least one driven shaft includes a pump 1 that is actuated by means of a drive unit 3. In the embodiment shown here, the pump 1 is a piston pump. This includes a pump piston 5 that delimits a first pump chamber 7 and a second pump chamber 9 in such a way that when the pump piston 5 moves, it decreases the volume of one of the two pump chambers 7, 9 while simultaneously increasing the volume of the other pump chamber 7, 9.

The device also includes a reservoir 11 that contains a pressurized hydraulic fluid 13. The hydraulic fluid 13 is preferably a hydraulic oil. The second pump chamber 9 of the pump 1 is hydraulically connected to a piston 17 via a first line 15. The piston 17 in the embodiment shown here is an annular piston that cooperates with a clutch element that is not shown here. With the aid of the piston 17, the clutch element is moved counter to the spring force of a piston spring element, from a first position into a second position and is held in this second position.

A single clutch of the kind shown in FIG. 1 is preferably engaged in the first position in which the clutch is held by the clutch spring element. In order to disengage the clutch, the piston 17 must exert a force that acts in opposition to the spring force of the clutch spring element. The required force is hydraulically transmitted to the piston 17. The first line 15 has a second line 19 branching off from it, which connects the first line 15 to the reservoir 11. The second line 19 contains a first valve 21 that is able to open or close the second line 19. The line 15 also has a third line 23 branching off from it, which feeds into the first pump chamber 7 of the pump 1. The first line 15 contains a first check valve 25 and the third line 23 contains a second check valve 27.

A 3-way valve 29 connects the first line 15 to a return line 31 that feeds into a sump 33. The sump 33 likewise contains hydraulic fluid 13.

A first supply line 35 that contains a third check valve 37 connects the second pump chamber 9 of the pump 1 to the sump 33. The first pump chamber 7 is likewise connected to the sump 33 via a second supply line 39 that contains a fourth check valve 41. Between the check valve 41 and the first pump chamber 7, a third return line 43 that contains a second valve 45 branches off from the second supply line 39.

In order to bring the clutch into contact, pressure is exerted on the piston 17. This pressure is generated by the pump 1. When the pump piston 5 moves toward the drive unit 3, this expands the second pump chamber 9. As a result, the pressure in the second pump chamber 9 decreases. The decreasing pressure in the second pump chamber 9 causes hydraulic fluid to flow from the sump 3 into the second pump chamber 9 via the first supply line 35. At the same time, the volume of the first pump chamber 7 decreases. As a result, the pressure in the first pump chamber 7 increases. The pressurized hydraulic fluid is conveyed to the piston 17 via the third line 23 and the first line 15.

To prevent hydraulic fluid from flowing out of the first line 15 back into the sump 33, the 3-way valve 29 is switched so that the return line 31 is closed. When the pump piston 5 moves away from the drive unit 3, the first pump chamber 7 expands, causing its pressure to drop. Hydraulic fluid is conveyed from the sump 33 into the first pump chamber 7 via the second supply line 39. At the same time, the volume of the second pump chamber 9 decreases, thereby increasing the pressure in the second pump chamber 9. The more highly pressurized hydraulic fluid in the second pump chamber 9 flows to the piston 17 via the first line 15. An increased compressive force acts on the piston 17, causing the clutch to engage.

During the movement of the pump piston 5, the check valves 37 and 41 prevent hydraulic fluid from flowing back into the sump 33 via the supply line 37 or 39 when a pressure increase occurs in the first pump chamber 7 or second pump chamber 9. The check valves 25 and 27 prevent hydraulic fluid from flowing out of the contracting pump chamber 7, 9 into the expanding pump chamber 7, 9 since this would result in a failure to produce a pressure increase on the piston 17 and therefore a failure to bring the clutch into contact.

In order to regulate the contacting pressure of the clutch, the first valve 21 is opened and the 3-way valve 29 is switched so that the return line 31 into the sump 33 is closed. This switching arrangement allows hydraulic fluid to flow from the reservoir 11 to the piston 17. The pressure at which the hydraulic fluid flows from the reservoir 11 is controlled by means of the first valve 21. In order to be able to regulate the contacting pressure, it is necessary in this case for the pressure of the hydraulic fluid 13 in the reservoir 11 to be higher than the pressure of the hydraulic fluid that is used to act on the piston 17 in order to bring the clutch into contact.

In order to disengage the clutch, the 3-way valve 29 is switched so that the return line 31 is open and the connection from the piston 17 into the first line 15 is closed. This allows the hydraulic fluid to flow from the piston 17 into the sump 33 via the return line 31.

The filling of the reservoir 11 with hydraulic fluid 13 is carried out using the pump 1 in a manner similar to that in which the piston 17 is brought into contact. However in this case, the first valve 21 is open and the 3-way valve 29 closes the connection from the first line 15 to the piston 17 and as well as the connection to the sump 33 via the return line 31. Consequently, when the pump piston 5 moves in the direction of the drive unit 3, the volume of the first pump chamber 7 is reduced. This increases the pressure in the first pump chamber 7. The hydraulic fluid is conveyed to the reservoir 11 via the third line 23, the first line 15, and the second line 19. At the same time, the volume increase of the second pump chamber 9 causes hydraulic fluid to be conveyed from the sump 33 to the second pump chamber 9 via the first supply line 35.

When the pump piston 5 moves away from the drive unit 3, this reduces the volume of the second pump chamber 9. As a result, the pressure increases in the second pump chamber 9. The hydraulic fluid is transported to the reservoir 11 via the first line 15 and second line 19. At the same time, the volume increase of the first pump chamber 7 and the accompanying pressure drop in the first pump chamber 7 causes hydraulic fluid 13 to be conveyed from the sump 13 into the first pump chamber 7.

Figure 2:
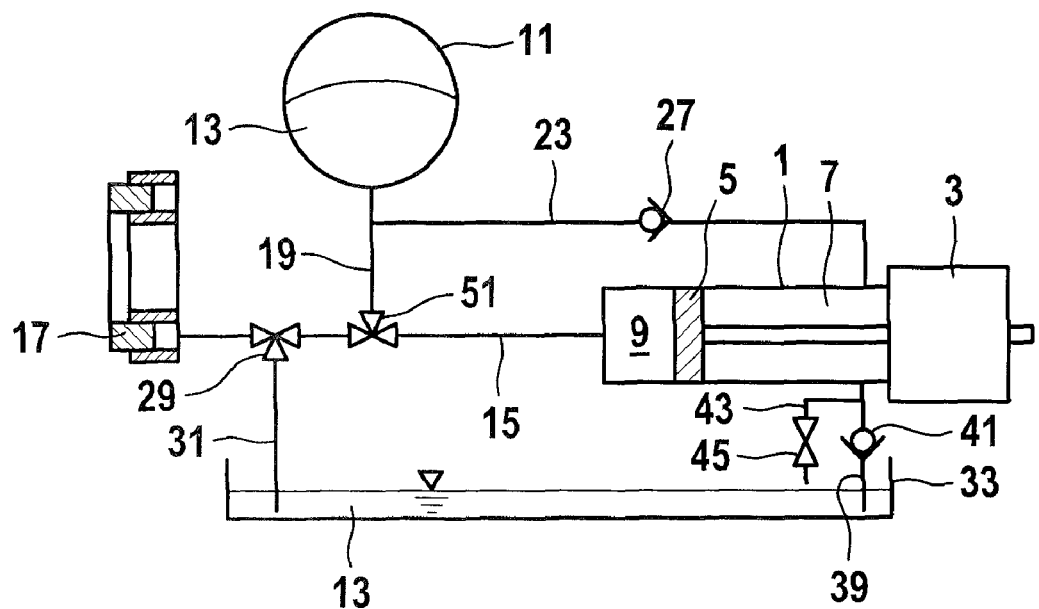

FIG. 2 shows a second embodiment of a device embodied according to the invention.

The embodiment shown in FIG. 2 differs from the one shown in FIG. 1 in that the second pump chamber 9 is not connected to the sump 33 via the first supply line 35. In addition, the third line 23 does not feed into the first line 15, but rather into the second line 19. The second line 19 is connected to the first line 15 via a second 3-way valve 51.

As in the embodiment shown in FIG. 1, in the embodiment shown in FIG. 2, a pressure is exerted on the piston 17 in order to bring the clutch into contact and to exert the required contacting pressure. To bring the clutch into contact, the pump piston 5 is moved into the second pump chamber 9. The volume of the second pump chamber 9 decreases, thus increasing the pressure of the hydraulic fluid contained in the second pump chamber. The pressurized hydraulic fluid from the second pump chamber 9 is conveyed to the piston 17 via the first line 15. In this case, the first 3-way valve 29 is opened so that the return line 31 is closed and the second 3-way valve 51 is switched so that the second line 19 is closed.

To reach pressure equilibrium in the first pump chamber 7, hydraulic fluid 13 flows from the sump 33 into the first pump chamber 7 via the second supply line 39. In order to hold the clutch in the engaged position and in order to exert the required contacting pressure of the clutch disks, the second 3-way valve is opened so that the reservoir 11 is connected to the piston 17 via the second line 19 and the first line 15. The required pressure on the piston 17 is exerted by means of the pressurized hydraulic fluid 13 in the reservoir 11. In this case, the pressure is controlled by means of the second 3-way valve 51. In order to disengage the clutch, the connection from the piston 17 to the second pump chamber 9 via the first line 15 is reopened. The return line 31 and the second line 19 remain closed.

The movement of the pump piston 5 toward the drive unit 3 increases the volume of the second pump chamber 9. The hydraulic fluid flows from the piston 17 back into the second pump chamber 9. The pressure that the second piston 17 exerts on the clutch is reduced. At the same time, in order to reach pressure equilibrium, hydraulic fluid flows from the first pump chamber 7 back into the sump 33 via the second return line 43. To this end, the second valve 45 is opened. Alternatively, though, it would also be possible for the second valve 45 to be kept closed. The hydraulic fluid from the first pump chamber 7 would then flow via the third line 23 into the reservoir 11, refilling the latter.

In order to rapidly disengage the clutch, the 3-way valve 29 is preferably switched so as to open the connection from the piston 17 to the sump via the return line 31. Then the hydraulic fluid flows into the sump 33 via this path. The pressure on the piston 17 is reduced.

After drainage of the hydraulic fluid into the sump 33 via the return line 31, in order to refill the second pump chamber 9 with a sufficient amount of hydraulic fluid, the connection from the sump 33 to the first line 15 via the return line 31 is opened by means of 3-way valve 29 while the connection to the piston 17 is closed. The movement of the pump piston 5 toward the drive unit 3 and the accompanying volume increase and resulting pressure decrease in the second pump chamber 9 causes hydraulic fluid to flow from the sump 33 into the second pump chamber 9 via the return line 31 and the first line 15.

Since the movement of the pump piston 5 simultaneously causes the volume of the first pump chamber 7 to decrease and therefore increases the pressure in the first pump chamber 7, it is possible to fill the reservoir 11 with hydraulic fluid via the third line 23 in this way. Alternatively, it is naturally also possible to open the second valve 45, allowing the hydraulic fluid to flow out of the first pump chamber 7 into the sump 33.

In addition to the filling of the reservoir 11 via the third line 23, it is also possible to fill the reservoir 11 from the second pump chamber 9. In this case, the second 3-way valve 51 is switched so that the connection from the first line 15 into the second line 19 is open and the connection from the first line 15 in the direction of the piston 17 is closed. The movement of the pump piston 5 away from the drive unit 3 decreases the volume of the second pump chamber 9. As a result, the pressure of the hydraulic fluid in the second pump chamber 9 increases. The hydraulic fluid is displaced from the second pump chamber 9 into the reservoir 11 via the first line 15 and the second line 19. The pressure decrease in the first pump chamber 7 due to its volume increase causes hydraulic fluid to be conveyed from the sump 33 into the first pump chamber 7 via the second supply line 39.

Because a filling of each of the two pump chambers 7, 9 with hydraulic fluid occurs in the embodiments in FIGS. 1 and 2, it is possible to move the pump piston 5 with less force than would be required if the pressure in one pump chamber 7, 9 were to decrease due to its volume increase. This makes it possible to reduce the amount of energy required to move the pump piston 5.

The application of the required force on the clutch by means of the reservoir 11 does not require any additional energy to exert the required pressure. This yields an additional energy savings.

Alternatively, is naturally also possible in the embodiments shown in FIGS. 1 and 2 to use the pressurized hydraulic fluid 13 from the reservoir 11 to bring the clutch into contact and to use the pump 1 to supply the contacting force required for the transmission of torque.

Alternatively, it is also possible to design the clutch so that it is engaged in the normal state and is disengaged with the application of the pressure. In this case, the clutch differs merely in that the clutch spring element presses the clutch disks against each other whereas in the embodiment in which the clutch is engaged through the exertion of a pressure on the piston 17, the clutch spring element holds the clutch in the disengaged position.

Figure 3:
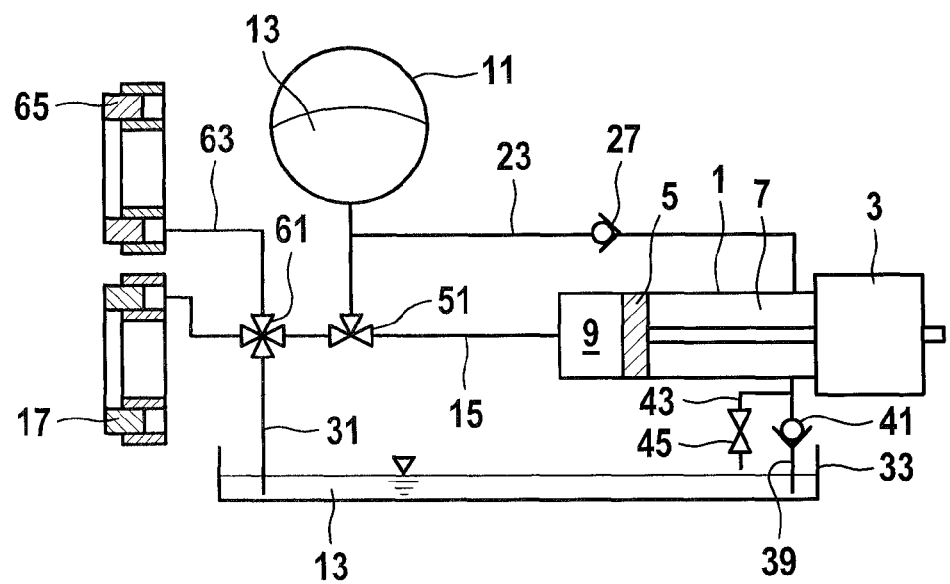

FIG. 3 shows a device according to the invention for actuating a double clutch.

The embodiment shown in FIG. 3 differs from the one shown in FIG. 2 in that the 3-way valve 29 has been replaced by a 4-way valve 61. The fourth path of the 4-way valve 61 is connected to a fourth line 63 via which a second piston 65 can be acted on with pressure. The second piston 65 is preferably also an annular piston. The second piston 65 actuates the second clutch of the double clutch. In a double clutch, normally one clutch is disengaged while the other clutch is engaged. According to the invention, in order to bring one of the two clutches into contact, the 4-way valve 61 is switched so that a hydraulic connection is produced from the piston 17 to the second piston 65.

Via this hydraulic connection, hydraulic fluid can flow from the piston 17 or 65 of the disengaging clutch to the other piston 17, 65 that is bringing the second clutch into contact. In order to exert the required contacting pressure on the engaged clutch, pressurized hydraulic fluid is either conveyed from the second pump chamber 9 to the engaged clutch via the first line 15 or alternatively is supplied from the reservoir 11 via the 3-way valve 51. The filling of the reservoir 11, the first pump chamber 7, or the second pump chamber 9 occurs as described in conjunction with FIG. 2.

Figure 4:
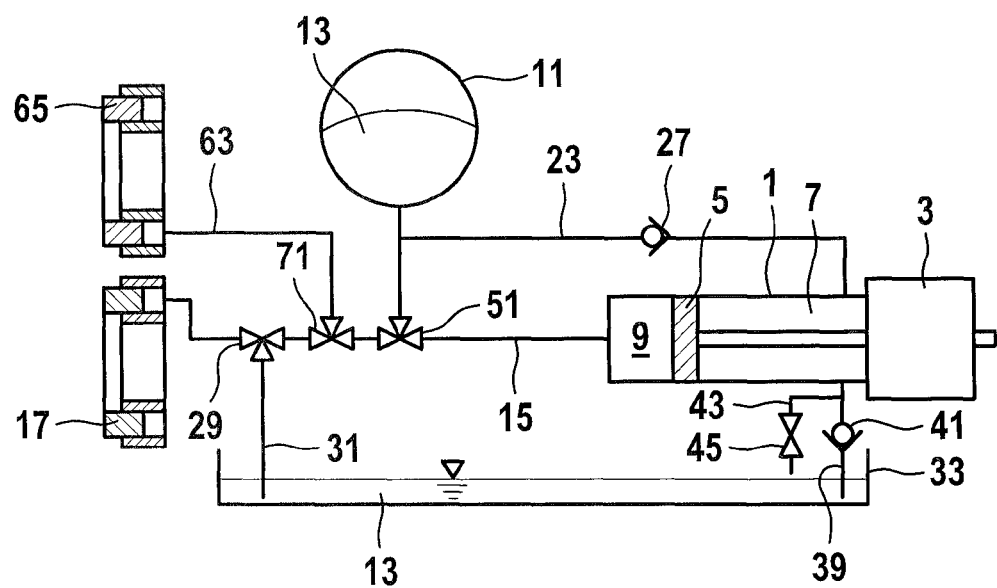

FIG. 4 shows a second embodiment of a device for actuating a double clutch.

The embodiment shown in FIG. 4 differs from the one shown in FIG. 3 in that in lieu of the 4-way valve 61, two 3-way valves 29, 71 are used. The manner in which they function, however, corresponds to that of the 4-way valve 61 shown in FIG. 3.

In addition to the embodiments shown in FIGS. 1 through 4, the invention naturally also encompasses any other embodiment in which the clutch is brought into contact by means of the pump 1 and the clutch is held in place by pressurized hydraulic fluid 13 from the reservoir 11 or in which the clutch is brought into contact by pressurized fluid 13 from the reservoir 11 and the clutch is held in place by the pump 1.

It will be understood that each of the elements described above, or two or more together, may also find a useful application in other types of constructions and methods differing from the type described above.

While the invention has been illustrated and described as embodied in a device and method for actuating a clutch, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. A device for actuating a clutch of a transmission for transmitting a torque from at least one drive shaft to at least one driven shaft, the device comprising:
   at least one hydraulically triggered piston which acts on a clutch spring element, wherein the clutch is moved by impingement of a pressure on the at least one hydraulically triggered piston;
   a pump that is hydraulically connected to said piston, wherein said pump is a piston pump with a pump piston, a first pump chamber and a second pump chamber;
   a first line, wherein via the first line, the second pump chamber is hydraulically connected with the piston;
   a reservoir which is filled with hydraulic fluid;
   a second line, wherein by means of a three-way valve, the second line is hydraulically connected with the first line and wherein the second line connects the first line with the reservoir;
   a third line, wherein the third line branches off from the second line and opens into the first pump chamber and is hydraulically connected with the first pump chamber,
   wherein the actuation of the piston takes place either by means of the pump or by means of the reservoir,
   wherein the reservoir is fillable in both of two movement directions of the pump piston of the pump, and
   wherein with a closed hydraulic connection between the second line and the first line upon opening of the clutch, the hydraulic fluid flows from the piston into the second pump chamber and the hydraulic fluid flows from the first pump chamber via the third line into the reservoir.

2. A device as defined in claim 1, wherein the device is configured so that the transmission of torque from the at least one drive shaft to the at least one driven shaft is interrupted when the clutch is actuated.

3. A device as defined in claim 1, wherein said piston that acts on the clutch spring element is configured as an annular piston.

4. A device as defined in claim 1, wherein said reservoir is hydraulically connected to said pump in such a way that said pump fills said reservoir.

5. A device as defined in claim 1; and further comprising a sump that contains hydraulic fluid, said pump being hydraulically connected to said sump.

\* \* \* \* \*